(12) United States Patent
Amano

(10) Patent No.: US 8,184,529 B2
(45) Date of Patent: May 22, 2012

(54) COMMUNICATION APPARATUS, METHOD, AND PROGRAM FOR TRANSMITTING AND RECEIVING PACKET DATA

(75) Inventor: Katsuhiro Amano, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 336 days.

(21) Appl. No.: 12/588,350

(22) Filed: Oct. 13, 2009

(65) Prior Publication Data

US 2010/0097960 A1    Apr. 22, 2010

(30) Foreign Application Priority Data

Oct. 17, 2008    (JP) .................................. 2008-268329

(51) Int. Cl.
*H04J 3/14*    (2006.01)

(52) U.S. Cl. ......... 370/229; 370/252; 370/516; 709/232

(58) Field of Classification Search ........................ None
See application file for complete search history.

(56) References Cited

U.S. PATENT DOCUMENTS

| | | | |
|---|---|---|---|
| 6,574,213 B1 * | 6/2003 | Anandakumar et al. ...... | 370/349 |
| 6,680,955 B1 | 1/2004 | Le | |
| 6,928,473 B1 * | 8/2005 | Sundaram et al. ........... | 709/224 |
| 7,242,668 B2 * | 7/2007 | Kan et al. ...................... | 370/234 |
| 7,822,073 B2 * | 10/2010 | Wang et al. ................... | 370/516 |
| 2002/0004841 A1 * | 1/2002 | Sawatari ....................... | 709/232 |
| 2003/0076784 A1 * | 4/2003 | Ta et al. ........................ | 370/250 |
| 2010/0220615 A1 * | 9/2010 | Enstrom et al. .............. | 370/252 |

FOREIGN PATENT DOCUMENTS

| JP | A-2007-36960 | 2/2007 |
|---|---|---|
| JP | A-2007-67972 | 3/2007 |

OTHER PUBLICATIONS

European Search Report for Application No. 09252429.7, issued Jan. 22, 2010.

\* cited by examiner

*Primary Examiner* — Brian Roberts
(74) *Attorney, Agent, or Firm* — Oliff & Berridge, PLC

(57) ABSTRACT

A communication apparatus that includes a media processing device that includes at least one codec and that encodes data, a packet processing device that transmits and receives packet data, a correlation value computation device that computes a correlation value between jitter of packet data transmitted to a partner communication apparatus and jitter of packet data transmitted from the partner communication apparatus, and a session control device that, in a case where the correlation value computed by the correlation value computation device is equal to or larger than a specified value, performs one of an encoding speed conversion within a codec in use, a transmission packet length conversion, a packet transmission interval conversion, a packet transmission priority conversion, and a codec type conversion from the codec in use to another type of codec, based on QoS information of the packet data transmitted from the partner communication apparatus.

9 Claims, 6 Drawing Sheets

COMMUNICATION APPARATUS, METHOD, AND PROGRAM FOR TRANSMITTING AND RECEIVING PACKET DATA

CROSS-REFERENCE TO RELATED APPLICATION

This application claims priority to Japanese Patent Application No. 2008-268329, filed Oct. 17, 2008, the disclosure of which is hereby incorporated by reference herein in its entirety.

BACKGROUND

The present invention relates to a communication apparatus, a communication method for a communication apparatus, and a computer-readable medium storing a communication control program for a communication apparatus. More specifically, the present invention relates to a communication apparatus, a communication method for a communication apparatus, and computer-readable medium storing a communication control program for a communication apparatus that perform transmission and receiving of packet data.

A teleconferencing system is known that implements a conference among persons in remote locations by connecting a plurality of terminals through a network and transmitting and receiving both images and sound bidirectionally. Furthermore, a technology is known that, in a terminal for Real-time Transport Protocol (RTP) communication, provides feedback by returning, from a receiving terminal to a transmitting terminal through a network, feedback information that utilizes the Real-time Transport Control Protocol (RTCP) that controls a session for transmitting and receiving data by the RTP.

SUMMARY

In the RTP communication terminal that is described above, there is a demand to perform, as rapidly as possible, session control that utilizes network quality information that is detected by a receiving terminal to perform an encoding speed conversion within a single codec, a transmission packet length conversion, a packet transmission interval conversion, a packet transmission priority conversion, a type conversion from a first codec to a second codec, and the like.

The present invention provides a communication apparatus, a communication method for a communication apparatus, and a computer-readable medium storing a communication control program for a communication apparatus that make it possible, in session control in communication apparatuses that are connected to one another through a network, to utilize rapidly feedback information from the communication apparatus on the receiving side while control of data transmission by the communication apparatus on the transmitting side is being performed.

Exemplary embodiments provide a communication apparatus that includes a media processing device, a packet processing device, a correlation value computation device, and a session control device. The media processing device includes at least one codec and encodes data. The packet processing device transmits and receives packet data. The correlation value computation device computes a correlation value between jitter of packet data transmitted to a partner communication apparatus and jitter of packet data transmitted from the partner communication apparatus The session control device performs one of an encoding speed conversion within a codec in use, a transmission packet length conversion, a packet transmission interval conversion, a packet transmission priority conversion, and a codec type conversion from the codec in use to another type of codec, based on QoS information of the packet data transmitted from the partner communication apparatus, in a case where the correlation value computed by the correlation value computation device is equal to or larger than a specified value.

Exemplary embodiments also provide a communication method for a communication apparatus. The communication method includes a media processing step of encoding data using at least one codec, a packet processing step of transmitting and receiving packet data, a correlation value computation step of computing a correlation value between jitter of packet data transmitted to a partner communication apparatus and jitter of packet data transmitted from the partner communication apparatus, and a session control step of, in a case where the correlation value computed at the correlation value computation step is equal to or larger than a specified value, performing one of an encoding speed conversion within a codec in use, a transmission packet length conversion, a packet transmission interval conversion, a packet transmission priority conversion, and a codec type conversion from the codec in use to another type of codec, based on QoS information of the packet data transmitted from the partner communication apparatus.

Exemplary embodiments further provide a computer-readable medium storing a communication control program for a communication apparatus. The communication control program includes instructions that, when executed by a computer of the communication apparatus, performs a method. The method includes a media processing step of encoding data using at least one codec, a packet processing step of transmitting and receiving packet data, a correlation value computation step of computing a correlation value between jitter of packet data transmitted to a partner communication apparatus and jitter of packet data transmitted from the partner communication apparatus, and a session control step of, in a case where the correlation value computed at the correlation value computation step is equal to or larger than a specified value, performing one of an encoding speed conversion within a codec in use, a transmission packet length conversion, a packet transmission interval conversion, a packet transmission priority conversion, and a codec type conversion from the codec in use to another type of codec, based on QoS information of the packet data transmitted from the partner communication apparatus.

BRIEF DESCRIPTION OF THE DRAWINGS

Exemplary embodiments will be described below in detail with reference to the accompanying drawings in which.

DETAILED DESCRIPTION OF EXEMPLARY EMBODIMENTS

Hereinafter, a teleconferencing system 1 that is an exemplary embodiment of the present invention will be explained with reference to the drawings. First, a configuration of the teleconferencing system 1 will be explained with reference to FIG. 1.

Figure 1:
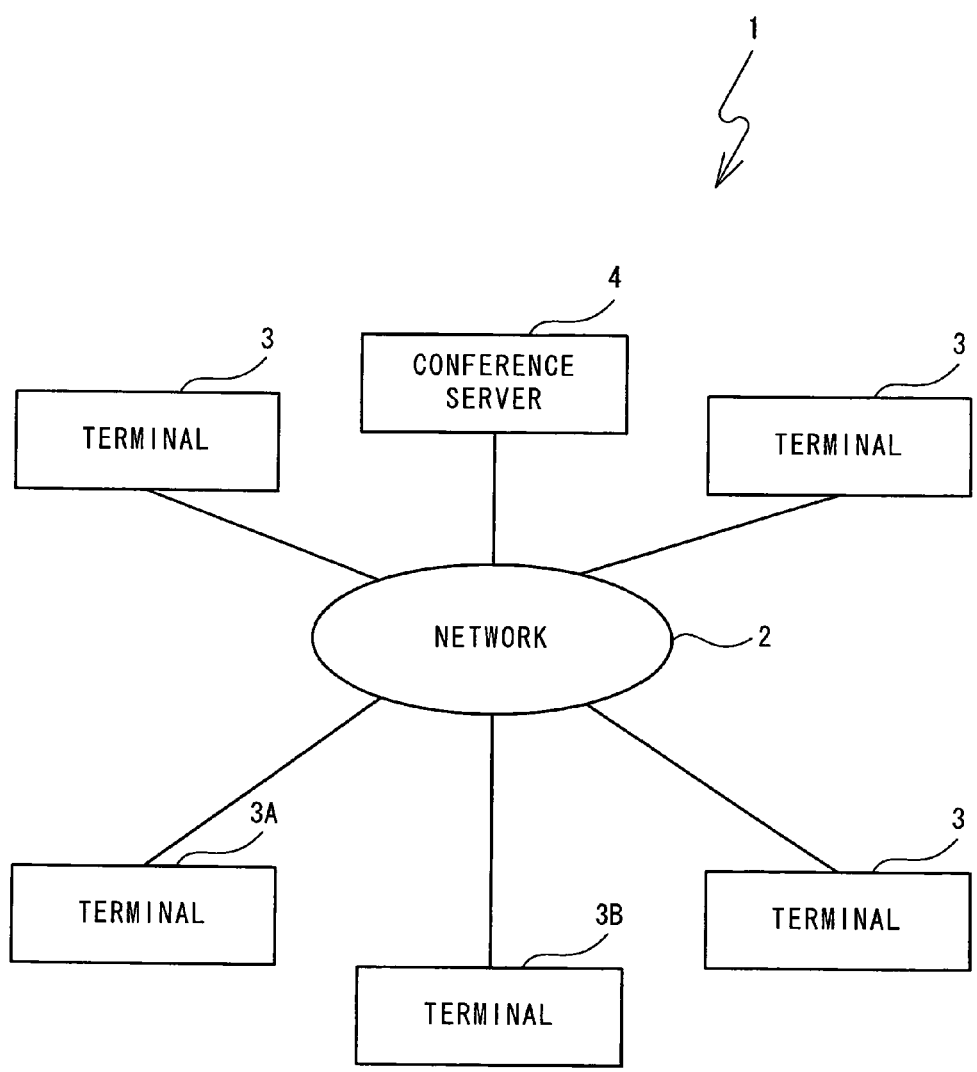
FIG. 1 is a block diagram that shows a configuration of a teleconferencing system 1.

As shown in FIG. 1, the teleconferencing system 1 includes a plurality of terminals 3 that are provided in various locations and a conference server 4 that controls a conference that is conducted among the plurality of terminals 3. The plurality of terminals 3 and the conference server 4 are connected to one another through a network 2. For the purpose of the explanation, a terminal that is installed in a location A is defined as a terminal 3A, and a terminal that is installed in a location B is defined as a terminal 3B. In the teleconferencing system 1, remote conferencing may be carried out by transmitting and receiving images and sound among the terminals 3 through the network 2.

The terminals 3, the terminal 3A, and the terminal 3B perform communications through the network 2. Examples of the network 2 include an IP network and an access network. The terminals 3, the terminal 3A, and the terminal 3B are capable of performing RTP communications, and each has at least one codec. Session control is performed in order to switch between a high compression codec and a high sound quality (low delay) codec in the case of audio, to switch between a high compression codec and a high image quality (low delay) codec in the case of video, and to switch among a plurality of codecs for a plurality of different media.

Figure 2:
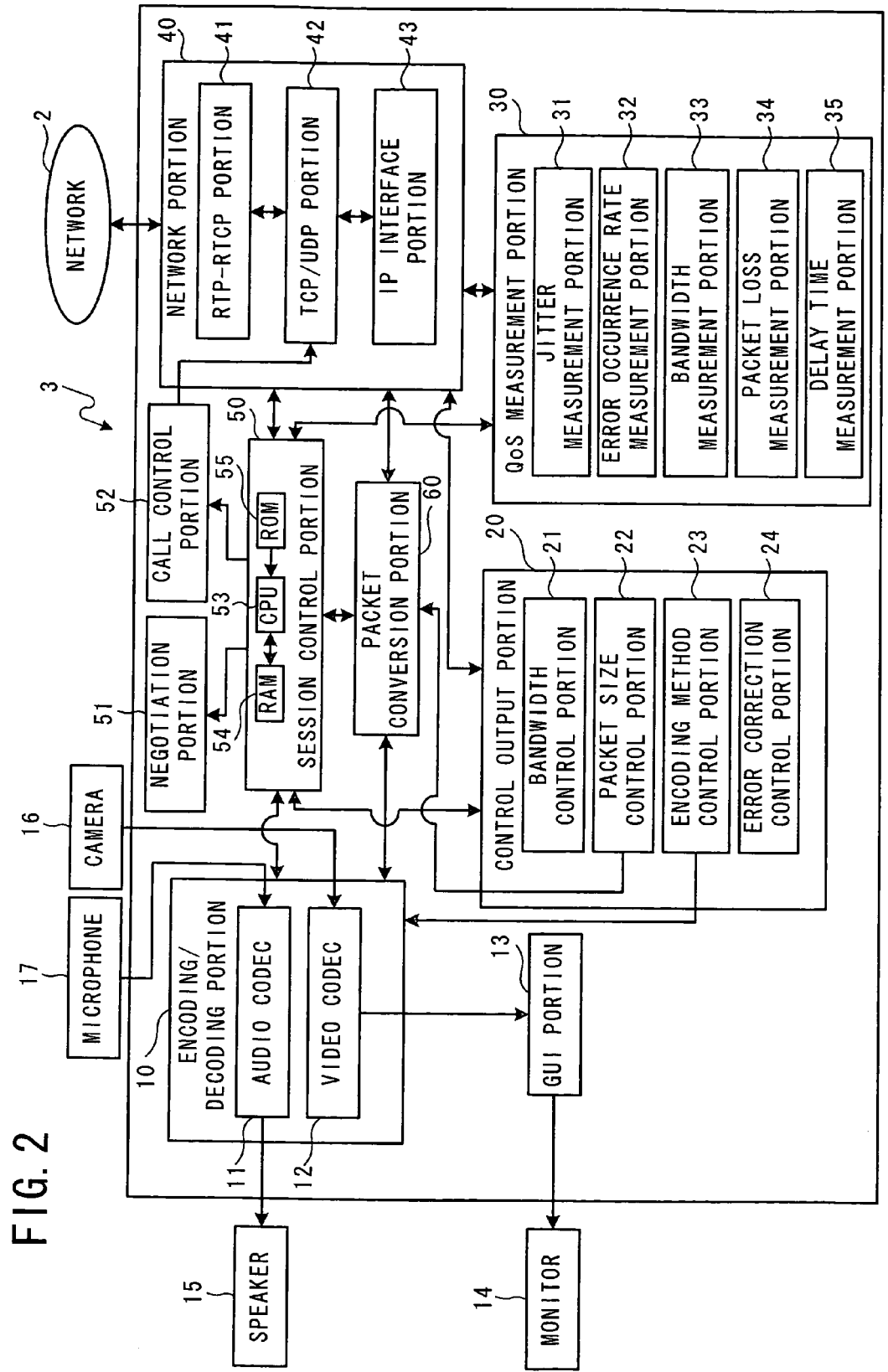
FIG. 2 is a functional block diagram that shows a configuration of a terminal 3.

Next, a configuration of each of the terminals 3 will be explained with reference to FIG. 2. The terminal 3A and the terminal 3B also have the same configuration as each of the terminals 3. As shown in FIG. 2, the terminal 3 includes an encoding/decoding portion 10, a control output portion 20, a quality of service (QoS) measurement portion 30, a network portion 40, a session control portion 50, a packet conversion portion 60, a negotiation portion 51, a call control portion 52, and a GUI portion 13.

Next, each of the structural elements will be explained in detail. The network portion 40 includes an RTP and RTCP portion 41, a TCP/UDP portion 42, and an IP interface portion 43. The RTP and RTCP portion 41 transmits and receives an RTP packet and an RTCP packet to and from another terminal 3. The TCP/UDP portion 42 processes a packet based on the Transmission Control Protocol (TCP) and the User Datagram Protocol (UDP). The IP interface portion 43 processes a packet based on the physical layer and the IP layer. The IP interface portion 43 transmits and receives an IP packet through the network 2 to and from another partner terminal 3.

The encoding/decoding portion 10 includes an audio codec 11 and a video codec 12. The audio codec 11 can encode into data a sound inputted from a microphone 17. The audio codec 11 can also decode encoded audio data and output sound from a speaker 15 through an audio amplification circuit, which is not shown in the drawings. The video codec 12 can encode into data a video inputted from a camera 16. The video codec 12 can also decode encoded video data and display video on a monitor 14 through the GUI portion 13.

Each of the audio codec 11 and the video codec 12 includes a plurality of types of codecs. For example, the audio codec 11 and the video codec 12 may each include a first codec and a second codec. The audio codec 11 may use a high sound quality (low delay) codec as the first codec, and use a high compression codec as the second codec. The high compression codec generates a smaller volume of audio data than does the high sound quality codec. The video codec 12 may use a high image quality (low delay) codec as the first codec and uses a high compression codec as the second codec. The high compression codec generates a smaller volume of video data than does the high image quality codec.

Any of various types of known codecs may be selected and used as the first codec and the second codec. For example, for the audio codec 11, the G.711 standard may be used for the first codec (the high sound quality codec), and the G.723.1 standard may be used for the second codec (the high compression codec). Further, for the video codec 12, the H.261 standard may be used for the first codec (the high image quality codec), and the H.264 standard may be used for the second codec (the high compression codec).

The control output portion 20 includes a bandwidth control portion 21, a packet size control portion 22, an encoding method control portion 23, and an error correction control portion 24. The bandwidth control portion 21, in a case where TCP is used, controls the bandwidth to avoid congestion. The packet size control portion 22 controls the packet size by controlling the packet conversion portion 60. The encoding method control portion 23 controls the encoding/decoding portion 10. The error correction control portion 24 controls the correction of errors that may be generated in the decoding performed by the encoding/decoding portion 10.

The negotiation portion 51 performs switching between full-duplex communication and half-duplex communication. The call control portion 52 controls calling of another terminal that is a partner of the session.

The QoS measurement portion 30 includes a jitter measurement portion 31, an error occurrence rate measurement portion 32, a bandwidth measurement portion 33, a packet loss measurement portion 34, and a delay time measurement portion 35. The QoS measurement portion 30 measures QoS information for the RTP/RTCP base and computes an R value based on the QoS information. In the present embodiment, the QoS information may include the items listed below, for example.

(1) Delay: A value that is equal to one-half of the round-trip time (RTT) for the transmission and receiving of the most recent RTCP packet (arithmetic mean delay, maximum delay)

(2) The cumulative number of packets lost (CNOPL) since the start of communication (packet loss rate)

(3) Jitter: Variations in the intervals at which the packets arrive (arithmetic mean jitter, maximum jitter)

The R value that is defined in the ITU-T Recommendation G.107 is computed based on the measured QoS information. The specific procedure for computing the R value is shown below.

$$R = Ro - Is - Id - Ie, \text{eff} + A$$

The values Ro, Is, and A are known values measured and set in advance in accordance with the terminal that performs the measurement. Id is determined by a procedure that is described in the ITU-T Recommendation G.107, using values T, Tr, and Ta, as well as known values that are measured and set in advance in accordance with the terminal.

Ie, eff is determined by a procedure that is described in the ITU-T Recommendation G.107, using values Ppl, and Ie, as well as values that are set in advance according to the type of the audio codec that is used. The procedures for computing the values T, Tr, Ta, Ppl, and Ie are shown below.

The values below is obtained using the round-trip time (RTT) that is obtained from an RTCP transmission and receiving history and playback start time information (JitterNrm) in a jitter buffer.

$$Tr = RTT$$

$$T = Tr/2$$

$$Ta = Tr/2 + JitterNrm$$

Next, the value below is obtained using a number of packets lost (NPL) within the network, which is obtained from a packet receiving history, a number of packets lost (JBPL) within the jitter buffer, which is obtained from a jitter buffer history, and a total number of packets (Npackets).

$Ppl=((NPL+JBPL)/Npackets) \times 100.0$

Last, the value of Ie is obtained based on Tables I2 to I3 in the ITU-T Recommendation G.113, using the type of the codec and the value of Ppl.

The session control portion 50 performs the main control of the terminal 3 and includes a CPU 53, a RAM 54, and a ROM 55. The session control portion 50 controls the encoding/decoding portion 10, the control output portion 20, the QoS measurement portion 30, the network portion 40, the negotiation portion 51, and the call control portion 52. The session control portion 50 compares the R value based on the QoS information to a specified threshold value. The session control portion 50 then performs the session control in accordance with the results of the comparison. For example, any one of the conversions listed below may be performed for the session control.

(1) An encoding speed conversion within a single codec
(2) One of a transmission packet length conversion and a packet transmission interval conversion
(3) A packet transmission priority conversion
(4) A type conversion from a first codec to a second codec The packet conversion portion 60 converts the encoded data into a packets of a specified number of units.

Figure 5:
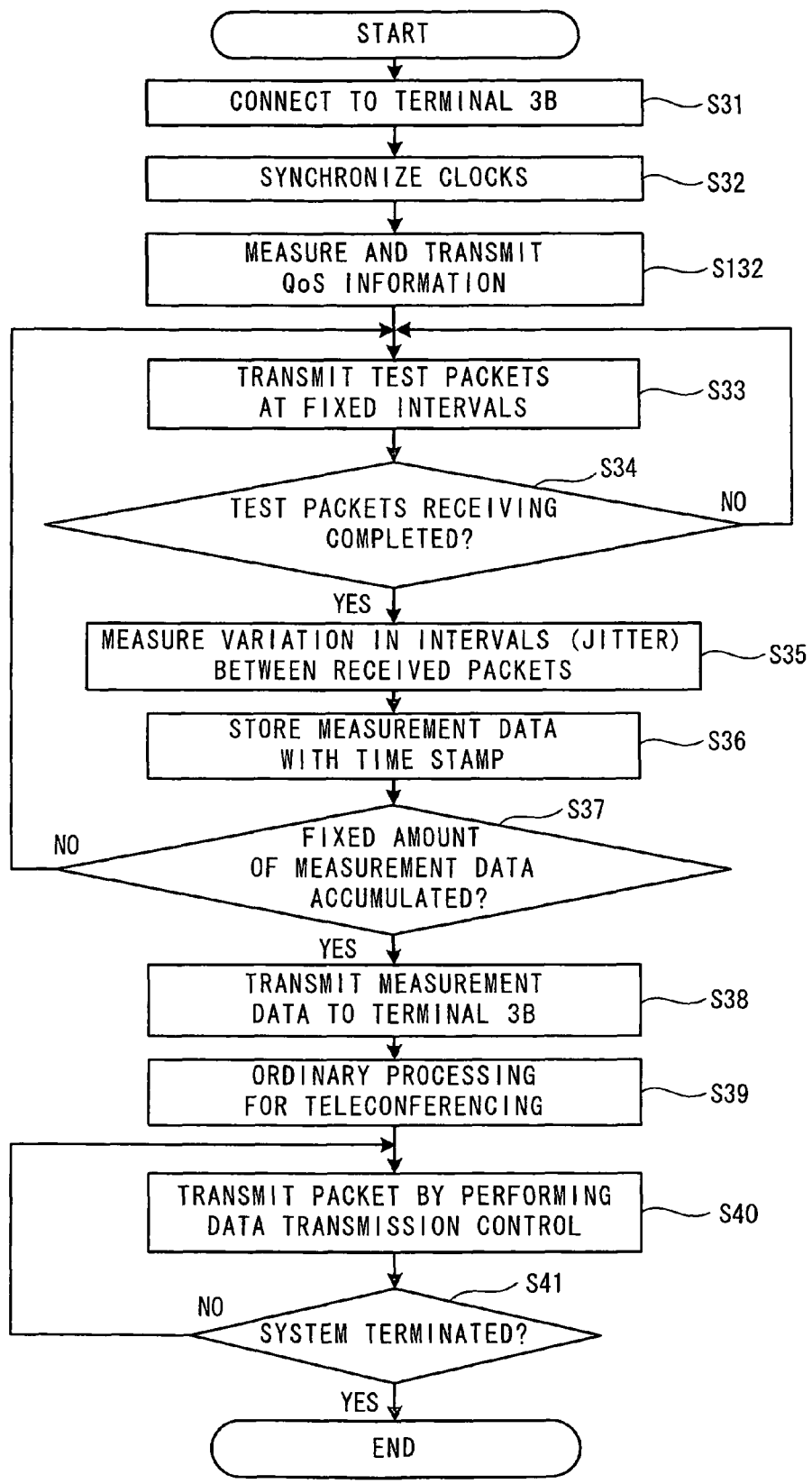
FIG. 5 is a flowchart of control processing of a terminal 3A.
Figure 6:
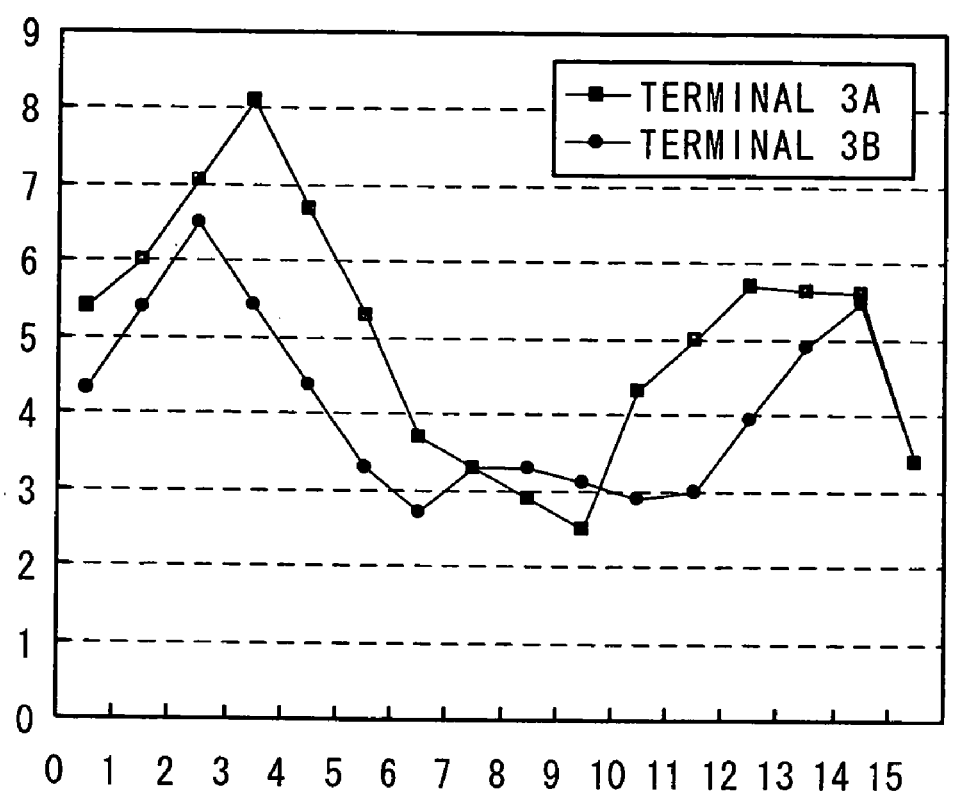
FIG. 6 is a graph that shows a correlation of jitter in the terminals 3A and 3B

Next, an example of the session control in a case where a teleconference is conducted by transmitting and receiving packets of audio data and video data between the terminal 3A and the terminal 3B that are shown in FIG. 1 will be explained with reference to flowcharts in FIGS. 3 to 5, as well as to Table 1 and a graph that is shown in FIG. 6.

The control of communication between the terminal 3A and the terminal 3B will be explained with reference to the flowcharts in FIGS. 3, 4, and 5. To start the communication, the terminal 3A and the terminal 3B are connected through the network 2 (Step S11 in FIG. 3; Step S31 in FIG. 5). The terminal 3A and the terminal 3B perform clock synchronization in accordance with the RTP specifications (Step S12 in FIG. 3; Step S32 in FIG. 5).

Figure 3:
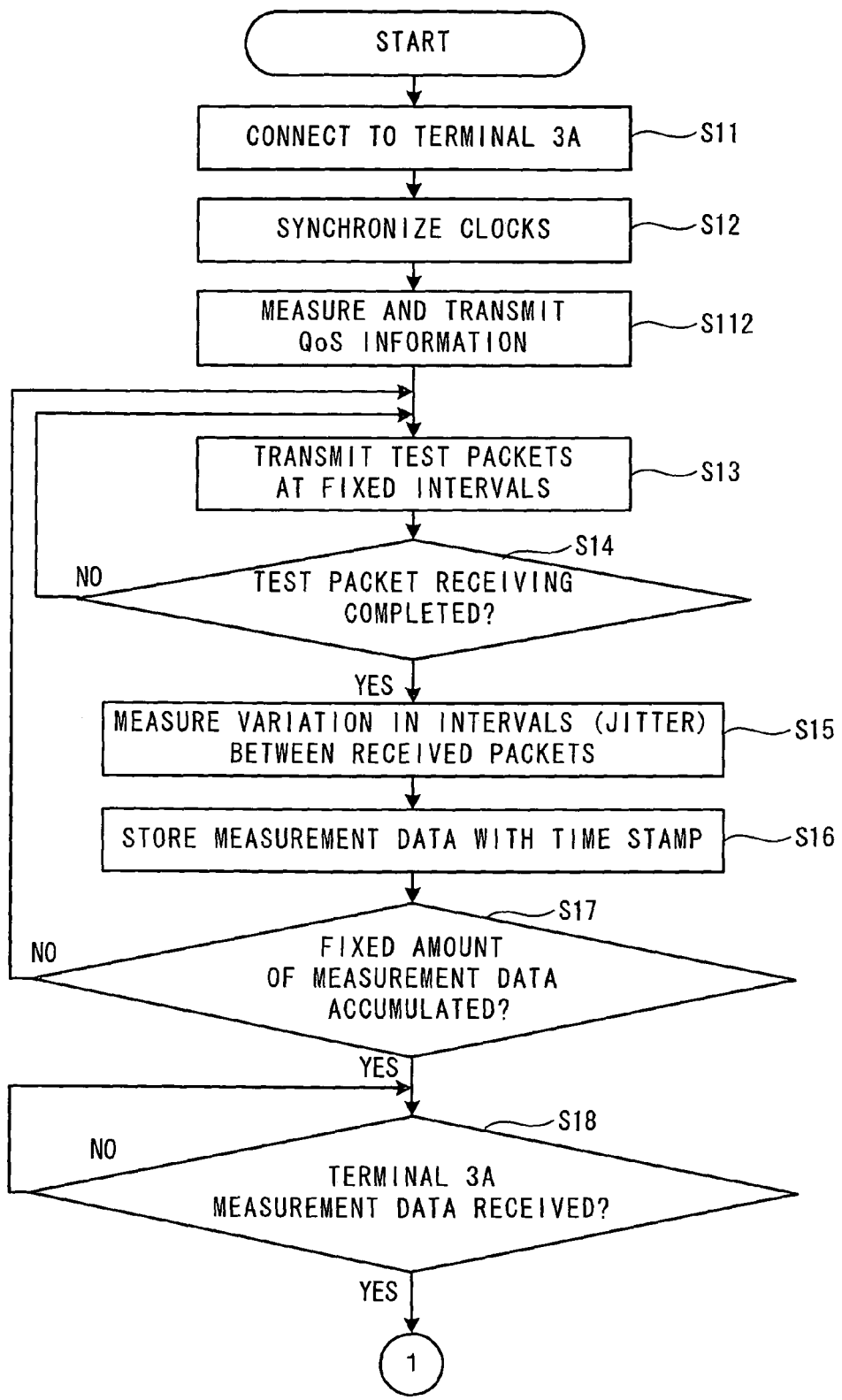
FIG. 3 is a flowchart of control processing of a terminal 3B.

The terminal 3A and the terminal 3B respectively measures the QoS information and transmit the measurement results each other (Step S112 in FIG. 3; Step S132 in FIG. 5). Specifically, various types of transmission state parameters are measured at each of the terminal 3A and the terminal 3B by the transmission and receiving between the terminal 3A and the terminal 3B of a Real Time Control Protocol (RTCP) packet that is a control packet (Step S112 in FIG. 3; Step S132 in FIG. 5).

As described above, the QoS measurement portion 30 measures the QoS information for the RTP/RTCP base and computes the R value based on the QoS information. The RTP and RTCP are protocols are widely used in general communication devices. Therefore, even in a case where the terminals 3A and 3B are not a special device but a general communication device, the communication apparatus may be able to acquire the QoS information. Note that the QoS information that is measured by the terminal 3A is stored in the RAM 54 of the session control portion 50 of the terminal 3A. The QoS information that is measured by the terminal 3B is stored in the RAM 54 of the session control portion 50 of the terminal 3B. At this time, the QoS information is also transmitted to the partner terminal, that is, from the terminal 3A to the terminal 3B, as well as from the terminal 3B to the terminal 3A. The terminal 3A also stores the QoS information received from the terminal 3B in the RAM 54 of the terminal 3A session control portion 50. The terminal 3B also stores the QoS information received from the terminal 3A in the RAM 54 of the terminal 3B session control portion 50.

Next, the terminal 3A transmits test RTP packets to the terminal 3B for a specified period of time at fixed intervals (Step S33 in FIG. 5). The terminal 3B also transmits test RTP packets to the terminal 3A for a specified period of time at fixed intervals (Step S13 in FIG. 3). For example, the specified interval may be one tick time, and the specified period of time may be fifteen tick times. One tick time is the minimum time stamp resolution at which one RTP packet is transmitted. One RTP packet is transmitted per one tick time.

In the terminal 3A, the test packets are received from the terminal 3B, and when the receiving of the test packets from the terminal 3B has been completed (YES at Step S34 in FIG. 5), the variation in the intervals between the packets that have been received from the terminal 3B (the jitter) is measured (Step S35).

An example of the method of measuring the jitter at the terminal 3A is described below. The terminal 3B transmits an RTP packet to the terminal 3A at a time TB1 (Step S13). In the time stamp field of the RTP header of the transmitted packet, the transmission time TB1 is included. The terminal 3A receives the packet at a time TA1. After a fixed interval (for example, one tick time) has passed from the time TB1, the terminal 3B transmits another RTP packet to the terminal 3A at a time TB2 (Step S13). In the time stamp field of the RTP header of the transmitted packet, the transmission time TB2 is included. The terminal 3A receives the packet at a time TA2. If the CPU 53 of the terminal 3A receives no more packets within a fixed period of time, the CPU 53 determines that the receiving of the test packets has been completed (YES at Step S34). Then, the CPU 53 measures the variation in the intervals between two consecutively received packets (the jitter).

A communication delay time (D1) for the first packet may be computed using the following equation:

Communication delay time $(D1)=TA1-TB1$

A communication delay time (D2) for the next packet may be computed using the following equation:

Communication delay time $(D2)=TA2-TB2$

A jitter (J1) may be computed using the following equation:

Jitter $(J1)=D2-D1$

The jitter (J1) obtained as above is stored in the RAM 54 of the terminal 3A, with a time stamp of the time TB2 (Step S36).

While a fixed amount of the jitter measurement data has not been accumulated (NO at Step S37), the CPU 53 of the terminal 3A returns to the processing at Step S33, and repeats the processing from Step S33 to Step 36. An example of the stored data in the RAM 54 of the terminal 3A is shown in Table 1 below.

TABLE 1

| Jitter Table (Terminal 3A) | |
|---|---|
| RTP time stamp (tick) | Jitter (ms) |
| 100 | 5.4 |
| 101 | 6 |
| 103 | 8.1 |
| 105 | 5.3 |

TABLE 1-continued

Jitter Table (Terminal 3A)

| RTP time stamp (tick) | Jitter (ms) |
| --- | --- |
| 106 | 3.7 |
| 109 | 2.5 |
| 110 | 4.3 |
| 112 | 5.7 |
| 114 | 5.6 |
| 115 | 3.4 |

In the terminal 3B, similar processing is performed. Specifically, the terminal 3B receives the test RTP packets transmitted from the terminal 3A, and when the receiving of the test packets from the terminal 3A has been completed (YES at Step S14 in FIG. 3), the variation in the intervals between the packets that have been received from the terminal 3A (the jitter) is measured (Step S15). The obtained jitter (J1) is stored in the RAM 54 of the terminal 3B for each packet received with a time stamp (Step S16). While a fixed amount of the jitter measurement data has not been accumulated (NO at Step S17), the CPU 53 of the terminal 3B returns to the processing at Step S13, and repeats the processing from Step S14 to Step 16. An example of the stored data is shown in Table 2 below.

TABLE 2

Jitter Table (Terminal 3B)

| RTP time stamp (tick) | Jitter (ms) |
| --- | --- |
| 100 | 4.3 |
| 102 | 6.5 |
| 105 | 3.3 |
| 106 | 2.7 |
| 107 | 3.3 |
| 108 | 2.9 |
| 110 | 3 |
| 113 | 4.9 |
| 114 | 5.5 |
| 115 | 3.4 |

In the terminal 3A, when the fixed amount of the jitter measurement data has been accumulated (YES at Step S37), the CPU 53 of the terminal 3A transmits to the terminal 3B the jitter measurement data that are shown in Table 1 (Step S38). Then, the ordinary processing for teleconferencing (negotiation processing by the negotiation portion 51 for media type commands and the like) is performed (Step S39). Subsequently, the CPU 53 of the terminal 3A performs data transmission control with respect to the terminal 3B and transmits the audio and video packets (Step S40). Thereafter, the CPU 53 of the terminal 3A repeats the processing from Step S40 to Step S41, as long as the system is not terminated (NO at Step S41). In a case where the system has been terminated (YES at Step S41), the above-described processing is terminated.

Meanwhile, in the terminal 3B, after the fixed amount of the jitter measurement data has been accumulated (YES at Step S17 in FIG. 3), the CPU 53 of the terminal 3B waits until the terminal 3B receives the jitter measurement data transmitted from the terminal 3A (NO at Step S18 in FIG. 3). When the terminal 3B has completed receiving of the jitter measurement data from the terminal 3A (YES at Step S18), the CPU 53 extracts the jitter data measured at the terminal 3B for the same time as the jitter data measured at and transmitted from the terminal 3A (Step S19 in FIG. 4). For portions for which there is no data for the same time, the terminal 3B generates data by performing linear compensation (Step S20 in FIG. 4).

A comparison table of the jitter data of the terminal 3A and the jitter data of the terminal 3B generated using the linear compensation is shown in Table 3 below. A graph is also shown in FIG. 6. Note that in Table 3, the tick time 0 indicates a reference time stamp of 100, and all of the tick times are expressed by subtracting 100 from the time stamp. Thus, a tick time of 1 indicates a time stamp of 101, a tick time of 10 indicates a time stamp of 110, and a tick time of 15 indicates a time stamp of 115.

TABLE 3

Comparison Table

| Tick time | Terminal 3A | Terminal 3B |
| --- | --- | --- |
| 0 | 5.4 | 4.3 |
| 1 | 6 | 5.4 |
| 2 | 7.05 | 6.5 |
| 3 | 8.1 | 5.43 |
| 4 | 6.7 | 4.37 |
| 5 | 5.3 | 3.3 |
| 6 | 3.7 | 2.7 |
| 7 | 3.3 | 3.3 |
| 8 | 2.9 | 3.3 |
| 9 | 2.5 | 3.1 |
| 10 | 4.3 | 2.9 |
| 11 | 5 | 3 |
| 12 | 5.7 | 3.95 |
| 13 | 5.65 | 4.9 |
| 14 | 5.6 | 5.5 |
| 15 | 3.4 | 3.4 |

Figure 4:
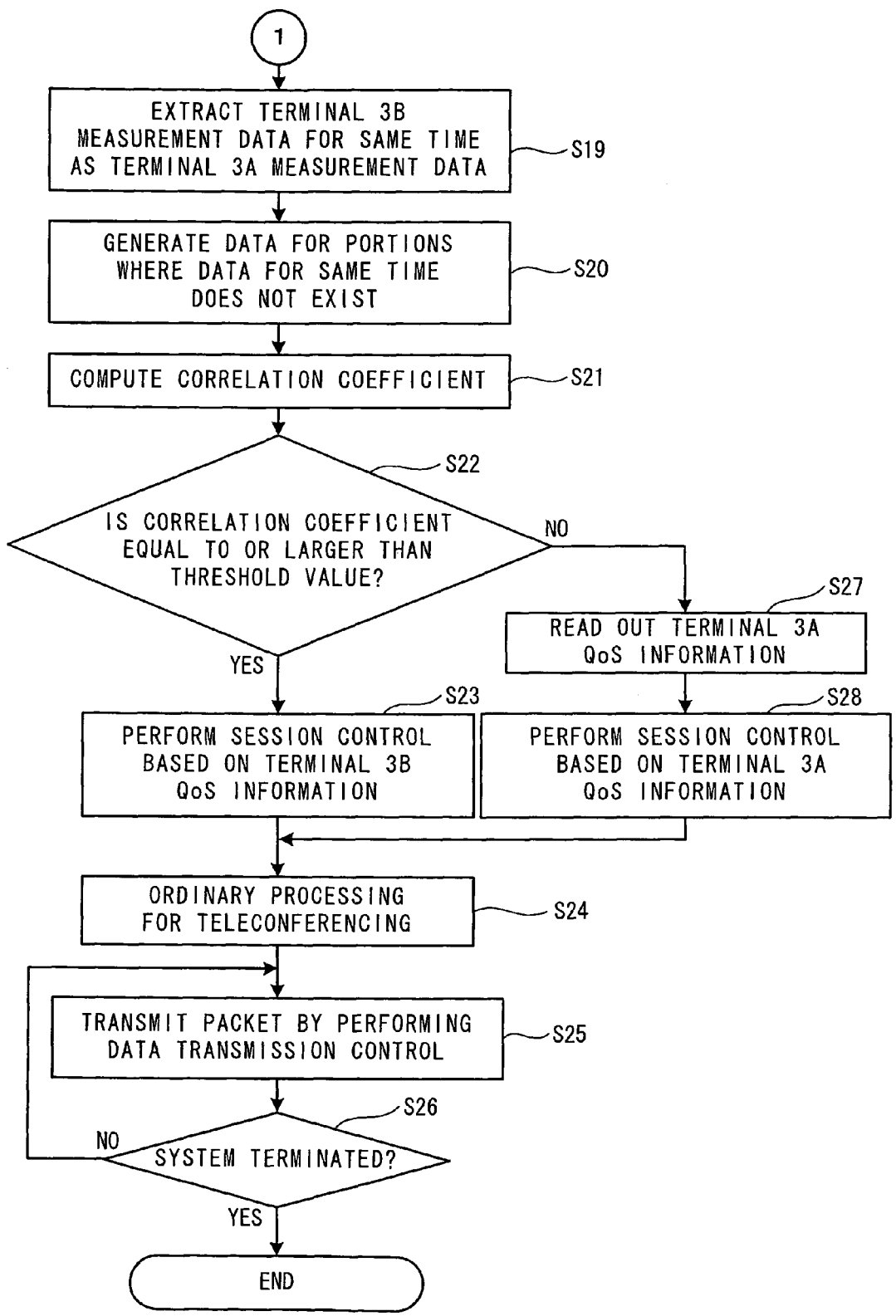
FIG. 4 is a flowchart of the control processing of the terminal 3B, continuing from FIG. 3.

The CPU 53 of the terminal 3B computes a correlation coefficient for the data for the same time (Step S21 in FIG. 4). The Pearson product-moment correlation coefficient may be employed as the correlation coefficient. The Pearson product-moment correlation coefficient can be obtained using Equation 1 given below, when a data string of two variables (x, y)=(xi, yi) (where i=1, 2, 3, . . . n) is given. The correlation coefficient takes on a value within a range from minus one (−1) to one (1). In the present example, the correlation coefficient is obtained as 0.8.

$$\frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad \text{Equation 1}$$

In a case where the absolute value of the correlation coefficient is equal to or larger than a specified threshold value (0.7 in the present example) (YES at Step S22), there is a correlation between the jitter data measured at the terminal 3A and the jitter data measured at the terminal 3B. Therefore, it may be assumed that congestion will occur at the same time in the uplink direction (transmission direction from the terminal 3B to the terminal 3A) and the downlink direction (transmission direction from the terminal 3A to the terminal 3B) when packets are transmitted in the network 2. In other words, it is assumed that the uplink route and the downlink route are the same. Accordingly, based on the QoS information of the terminal 3B that has been measured and stored in the RAM 54 at Step 112 in FIG. 3, the session control portion 50 (refer to FIG. 2) performs any one of the following conversions (Step S23): (1) the encoding speed conversion within a single codec; (2) one of the transmission packet length conversion and the packet transmission interval conversion; (3) the packet transmission priority conversion; (4)

the type conversion from the first codec to the second codec. Thus, efficient communication may be achieved in response to the expected congestion in the network 2.

In the processing at Step S23, for example, the R value based on the QoS information and the specified threshold vale (80 in the present example) are compared, and the session control is performed based on the result of the comparison. In a case where the R value based on the QoS information is less than 80, the encoding speed conversion within the single codec may be performed to realize efficient communication. In a case where the R value based on the QoS information is equal to or larger than 80, one of the transmission packet length conversion and the packet transmission interval conversion may be performed to realize efficient communication. In a case where R value based on the QoS information is equal to or larger than 80, conversion of the codec type, from the first codec to the second codec, for example, may be performed to realize efficient communication. The packet transmission priority conversion may be performed. For example, in a case where the R value based on the QoS information is less than 80, the audio packets may be given higher priority to be transmitted, and in a case where the R value is equal to or larger than 80, the audio packets and video packets are transmitted in chronological order with equal priority.

In a case where the absolute value of the correlation coefficient is less than the specified threshold value (0.7 in the present example) (NO at Step S22), the CPU 53 of the terminal 3B reads out the QoS information of the terminal 3A that has been transmitted from the terminal 3A and stored in the RAM 54 of the terminal 3B at Step 112 in FIG. 3 (Step S27). The session control portion 50 (refer to FIG. 2) then performs the same sort of session control as that described above, based on the QoS information of the terminal 3A. In such a case, the terminal 3B may acquire the QoS information of the terminal 3A without failure to perform feedback control, and thus at least congestion in the network may be prevented from occurring. Then, the ordinary processing for teleconferencing (negotiation processing by the negotiation portion 51 for media type commands and the like) is performed (Step S24). Subsequently, the CPU 53 of the terminal 3B performs data transmission control with respect to the terminal 3A and transmits the audio and video packets (Step S25). Thereafter, the CPU 53 of the terminal 3B repeats the processing from Step S25 to Step S26, as long as the system is not terminated (NO at Step S26). In a case where the system has been terminated (YES at Step S26), the processing that is described above is terminated.

As explained above, in the present embodiment, in a case where the absolute value of the correlation coefficient is equal to or larger than the specified threshold value (for example, 0.7), there is a correlation between the jitter data measured at the terminal 3A and the jitter data measured at the terminal 3B. Therefore, it may be assumed that congestion will occur at the same time in the uplink direction (transmission direction from the terminal 3B to the terminal 3A) and the downlink direction (transmission direction from the terminal 3A to the terminal 3B) when packets are transmitted in the network 2. In other words, it is assumed that the uplink route and the downlink route are the same. Therefore, in the terminal 3B, based on the QoS information of the terminal 3B, the session control portion 50 (refer to FIG. 2) performs any one of the following conversions: (1) the encoding speed conversion within a single codec; (2) one of the transmission packet length conversion and the packet transmission interval conversion; (3) the packet transmission priority conversion; (4) the type conversion from the first codec to the second codec. Thus, the session control portion 50 may control the session in real time to achieve efficient communication in response to the expected congestion in the network 2.

In the present embodiment, it is not necessary for the terminal 3B to request the terminal 3A to transmit the QoS information of the terminal 3A to receive it. Therefore, as compared to an apparatus that requests the partner apparatus to transmit the QoS information thereof to receive it, the time to be needed for the session control may be made shorter.

The present invention is not limited to the embodiment that is described above, and various modifications can be made. For example, in the above-described embodiment, the R value is computed according the ITU-T Recommendation G.107 using the QoS information measured at the terminal 3B, the R value cvalue is compared to the threshold value, and the session control is performed based on the results of the comparison (Step S23 in FIG. 4). However, it may not be necessary to compute the R value to be used for the session control. The QoS information measured at the terminal 3B may be used as it is.

For example, in a case where the delay measured as the QoS information is equal to or larger than a specific threshold value, the session control to use the codec with lower algorithm delay may be performed. More specifically, in a case where the first audio codec employs the G. 711 standard and the second audio codec employs the G. 723.1 standard, the first audio codec operates with lower algorithm delay. Accordingly, in a case where the delay is equal to or larger than the threshold value, the first audio codec may be used, and in a case where the delay is less than the threshold, the second audio codec may be used.

Alternatively, the jitter measured as the QoS information may be used. In a case where the jitter becomes large, the available bandwidth in the network 2 becomes narrower. Therefore, the session control may be performed such that in a case the jitter is equal to or larger than a specified threshold value, the codec with a higher compression rate may be used, and in a case where the jitter is less than the threshold value, the codec with higher audio quality may be used. In the above-described example of the first and second audio codecs, the second audio codec (G. 723.1) has a higher compression rate, and the first codec (G. 711) has higher audio quality. Accordingly, in a case the jitter is equal to or larger than a specified threshold value, the second audio codec may be used, and in a case where the jitter is less than the threshold value, the first codec may be used.

Further, the packet loss rate measured as the QoS information may be used. In a case where the packet loss rate is equal to or larger than a specified threshold value, lost packets may be given higher priority and retransmitted first, and in a case where the packet loss rate is less than the threshold value, all the packets may be sequentially transmitted in chronological order, without giving priority to any specific packets. In such a case, if the packet loss rate is large, the lost packets may be retransmitted promptly. Consequently, the realtimeness in playing audio and displaying video may be improved. The lost packets may reach the partner terminal before all data in the buffer, of the partner terminal has been played, thereby improving the packet loss tolerance.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication apparatus, comprising:
   a media processing device that includes at least one codec and that encodes data;
   a packet processing device that transmits and receives packet data;
   a correlation value computation device that computes a correlation value between jitter of packet data transmitted to a partner communication apparatus and jitter of packet data transmitted from the partner communication apparatus; and
   a session control device that, in a case where the correlation value computed by the correlation value computation device is equal to or larger than a specified value, performs one of an encoding speed conversion within a codec in use, a transmission packet length conversion, a packet transmission interval conversion, a packet transmission priority conversion, and a codec type conversion from the codec in use to another type of codec, based on Quality of Service (QoS) information of the packet data transmitted from the partner communication apparatus.

2. The communication apparatus according to claim 1, wherein the packet processing device includes:
   an Real-time Transport Protocol (RTP) processing device that transmits and receives an RTP packet; and
   an Real-time Transport Control Protocol (RTCP) processing device that transmits and receives an RTCP packet, and
   wherein the communication apparatus further comprises a QoS information measurement device that measures at least one of a delay, a packet loss rate, and jitter, using the RTP processing device and the RTCP processing device.

3. The communication apparatus according to claim 1, further comprising:
   a QoS information reading device that, in a case where the correlation value computed by the correlation value computation device is less than the specified value, reads out QoS information of the packet data received at the partner communication apparatus, the QoS information having been transmitted from the partner communication apparatus,
   wherein, in a case where the correlation value computed by the correlation value computation device is less than the specified value, the session control device performs one of the encoding speed conversion within the codec in use, the transmission packet length conversion, the packet transmission interval conversion, the packet transmission priority conversion, and the codec type conversion from the codec in use to another type of codec, based on the QoS information of the partner communication apparatus read out by the QoS information reading device.

4. A communication method for a communication apparatus, comprising:
   a media processing step of encoding data using at least one codec;
   a packet processing step of transmitting and receiving packet data;
   a correlation value computation step of computing a correlation value between jitter of packet data transmitted to a partner communication apparatus and jitter of packet data transmitted from the partner communication apparatus; and
   a session control step of, in a case where the correlation value computed at the correlation value computation step is equal to or larger than a specified value, performing one of an encoding speed conversion within a codec in use, a transmission packet length conversion, a packet transmission interval conversion, a packet transmission priority conversion, and a codec type conversion from the codec in use to another type of codec, based on Quality of Service (QoS) information of the packet data transmitted from the partner communication apparatus.

5. The communication method according to claim 4, wherein the packet processing step includes:
   an Real-time Transport Protocol (RTP) processing step of transmitting and receiving an RTP packet; and
   an Real-time Transport Control Protocol (RTCP) processing step of transmitting and receiving an RTCP packet, and
   wherein the communication method further comprises a QoS information measurement step of measuring at least one of a delay, a packet loss rate, and jitter, using the RTP processing step and the RTCP processing step.

6. The communication method according to claim 4, further comprising:
   a QoS information reading step of, in a case where the correlation value computed at the correlation value computation step is less than the specified value, reading out QoS information of the packet data received at the partner communication apparatus, the QoS information having been transmitted from the partner communication apparatus,
   wherein, in a case where the correlation value computed at the correlation value computation step is less than the specified value, the session control step performs one of the encoding speed conversion within the codec in use, the transmission packet length conversion, the packet transmission interval conversion, the packet transmission priority conversion, and the codec type conversion from the codec in use to another type of codec, based on the QoS information of the partner communication apparatus read out at the QoS information reading step.

7. A non-transitory computer-readable medium storing a communication control program for a communication apparatus, the communication control program comprising instructions that, when executed by a computer of the communication apparatus, performs a method comprising:
   a media processing step of encoding data using at least one codec;
   a packet processing step of transmitting and receiving packet data;
   a correlation value computation step of computing a correlation value between jitter of packet data transmitted to a partner communication apparatus and jitter of packet data transmitted from the partner communication apparatus; and
   a session control step of, in a case where the correlation value computed at the correlation value computation step is equal to or larger than a specified value, performing one of an encoding speed conversion within a codec in use, a transmission packet length conversion, a packet transmission interval conversion, a packet transmission priority conversion, and a codec type conversion from the codec in use to another type of codec, based on Quality of Service (QoS) information of the packet data transmitted from the partner communication apparatus.

8. The non-transitory computer-readable medium according to claim 7,
   wherein the packet processing step includes:

an Real-time Transport Protocol (RTP) processing step of transmitting and receiving an RTP packet; and an Real-time Transport Control Protocol (RTCP) processing step of transmitting and receiving an RTCP packet, and wherein the method further comprises a QoS information measurement step of measuring at least one of a delay, a packet loss rate, and jitter, using the RTP processing step and the RTCP processing step.

9. The non-transitory computer-readable medium according to claim 7, wherein the method further comprises a QoS information reading step of, in a case where the correlation value computed at the correlation value computation step is less than the specified value, reading out QoS information of the packet data received at the partner communication apparatus, the QoS information having been transmitted from the partner communication apparatus, and wherein, in a case where the correlation value computed at the correlation value computation step is less than the specified value, the session control step performs one of the encoding speed conversion within the codec in use, the transmission packet length conversion, the packet transmission interval conversion, the packet transmission priority conversion, and the codec type conversion from the codec in use to another type of codec, based on the QoS information of the partner communication apparatus read out at the QoS information reading step.

* * * * *